(12) United States Patent
Madan et al.

(10) Patent No.: US 7,841,202 B2
(45) Date of Patent: Nov. 30, 2010

(54) HEAT PACKAGES AND METHODS OF THEIR USE

(76) Inventors: Stephanie N. Madan, 43 E. Broad Oaks Dr., Houston, TX (US) 77056; Paul S. Madan, 43 E. Broad Oaks Dr., Houston, TX (US) 77056

( * ) Notice: Subject to any disclaimer, the term of this patent is extended or adjusted under 35 U.S.C. 154(b) by 253 days.

(21) Appl. No.: 10/877,328

(22) Filed: Jun. 25, 2004

(65) Prior Publication Data
US 2004/0261783 A1 Dec. 30, 2004

Related U.S. Application Data

(60) Provisional application No. 60/482,726, filed on Jun. 26, 2003.

(51) Int. Cl.
*F25D 3/00* (2006.01)
(52) U.S. Cl. .......................................... 62/293; 62/294
(58) Field of Classification Search .................. 126/204, 126/207, 263.01, 263.02, 246, 269, 263.06; 62/4, 293, 294, 60, 371, 372
See application file for complete search history.

(56) References Cited

U.S. PATENT DOCUMENTS

| | | | | | |
|---|---|---|---|---|---|
| 3,774,589 | A | * | 11/1973 | Kober | 126/263.02 |
| 4,106,478 | A | * | 8/1978 | Higashijima | 149/15 |
| 4,587,950 | A | * | 5/1986 | Mack et al. | 126/263.03 |
| 4,640,264 | A | * | 2/1987 | Yamaguchi et al. | 126/263.06 |
| 4,793,323 | A | * | 12/1988 | Guida et al. | 126/263.08 |
| 5,305,733 | A | * | 4/1994 | Walters | 126/263.01 |
| 5,461,867 | A | * | 10/1995 | Scudder et al. | 62/4 |
| 5,534,020 | A | * | 7/1996 | Cheney et al. | 607/108 |
| 6,060,266 | A | * | 5/2000 | Naqui et al. | 435/34 |
| 6,092,519 | A | * | 7/2000 | Fish et al. | 126/263.01 |
| 6,231,596 | B1 | * | 5/2001 | Collins | 607/114 |

* cited by examiner

Primary Examiner—Mohammad M Ali

(57) ABSTRACT

The present invention provides a heat package wherein a surface of a generating heat element that generates heat when exposed to atmosphere is placed against or attached to a heat conductive member. The heat element is protected from atmosphere until use. The heat package may include a heat-generating element attached to an insulating member with one or more air spaced there between. An outer surface of the heat-generating element can be exposed to atmosphere to produce heat when desired.

17 Claims, 5 Drawing Sheets

HEAT PACKAGES AND METHODS OF THEIR USE

CROSS-REFERENCE TO RELATED APPLICATIONS

This application takes priority from U.S. Provisional Patent Application Ser. No. 60/482,726, filed Jun. 26, 2003.

BACKGROUND OF THE INVENTION

1. Field of the Invention

This invention relates generally to heat packages for heating packaged food, use for therapeutic purposes and for heating other materials without using conventional heat sources such as electric energy, gas, oil charcoal etc.

2. Background

Packaged food is a widely accepted convenient food delivery system. Consumers' purchase decisions relating to such items are often driven by product convenience, portability, as well as how closely the food product parallels a conventionally prepared food item. Many such conventionally prepared foods are served hot. The emphasis on convenience is readily illustrated by packaged food products of interest to students ('SNACKABLES™'), Tuna-to-Go, etc.) as well as those of interest to hunters, campers and employees or personnel at remote locations (sandwiches, freeze-dried foods, dehydrated foods). Packaged food that is subsequently heated during a flight is often used by airlines. As highlighted by these examples, pre-packaged food is widely utilized by (a) persons in remote or inconveniently located sites, (b) persons in situations not conducive to traditional food storage and preparation and (c) persons to whom the convenience of pre-packaged food is of paramount importance. In many such situations it is often impractical or unsafe to utilize conventional heat sources such as electric, gas or oil heaters or other traditional heating methods.

Much packaged ready-to-eat food is stored and served at room temperature (ambient temperature) despite the fact that the taste experience would improve materially were the food warmer when consumed. Moreover, consumers would prefer the option of purchasing food both convenient in packaging and easily heated without the need for conventional heating equipment. Such an option can be superior to and different from packaged food items presently available.

In colder environments increasing food temperature by as few as ten or twenty degrees Fahrenheit may significantly improve the quality of the food's taste. Food products packaged with heat elements designed and placed to heat the food contents to a degree sufficient to improve the perceived taste quality would be desirable for various entities or individuals including the institutional food delivery programs in prisons, hospitals, etc.

In many other situations, people need access to heat packages designed as comfort and therapeutic elements and in situations requiring responses to pain and/or discomfort due to bodily injury or environmental extremes. The same is true for animals, particularly domesticated animals. Self-generating heat chambers or enclosures can also be used to enclose botanical elements during cold weather. At present there are few self-heating conveniently packaged products addressing these needs, at least some of which lack ergonomic flexibility and are inefficient in heat delivery.

Safe materials that generate heat when exposed to atmosphere (i.e., by exothermic reaction) have been available for some time and are utilized, for example, in heating pads. The amount and consistency of heat generated varies depending upon the type of materials used that generate heat due to exothermic reaction, the quantity of the material used, the extent of exposure to atmosphere, etc.

This invention provides heat packages and heat elements for heating food and other materials and for use as heat pads. This invention also provides for self-contained food packages that can be heated when desired in a safe and efficient manner without the need for conventional heating sources such as stoves, electric heaters and the like.

SUMMARY OF THE INVENTION

The present invention provides a heat package that includes a heat generating element or heat element that generates heat when exposed to atmosphere. An insulating material may be placed or juxtaposed to a surface of the heat element to reduce loss of heat to the environment and direct the generated heat toward the object that is desired to be heated. In one aspect, one or more air passages or spaces are provided between the heat element and the insulating material. A heat-conductive member may be placed on the heat element surface to absorb and evenly distribute heat to an object. A fabric or other soft material may be used instead when such heat packages are used on human or animals. The heat package may be pre-formed to fit a part of a human or an animal body or any other desired object. Straps or other devices may be attached to the heat package to arrange and/or secure the heat package about an object. The heat element surfaces to be exposed to atmosphere to generate heat are insulated or protected from atmosphere by a removable material that prevents exposure of the heat element to the atmosphere until its use is desired.

In another embodiment, the heat package may include a number of heat element strips or heat element members arranged in a pattern and placed against a heat conductive material. The heat strips may be partially protected from atmosphere by insulating material that prevents at least some of the heat from dissipating to atmosphere during use of the heat package. The heat strips may be attached on one or more outer surfaces of the container.

In another embodiment the heat package includes a container that provides air gaps or passages when placed against a heat element. In another embodiment, a heat element may be attached to a heat conductive member and wherein all surfaces that are exposed to atmosphere are protected from atmosphere until use.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawing.

DETAILED DESCRIPTION OF PREFERRED EMBODIMENTS

Figure 1:
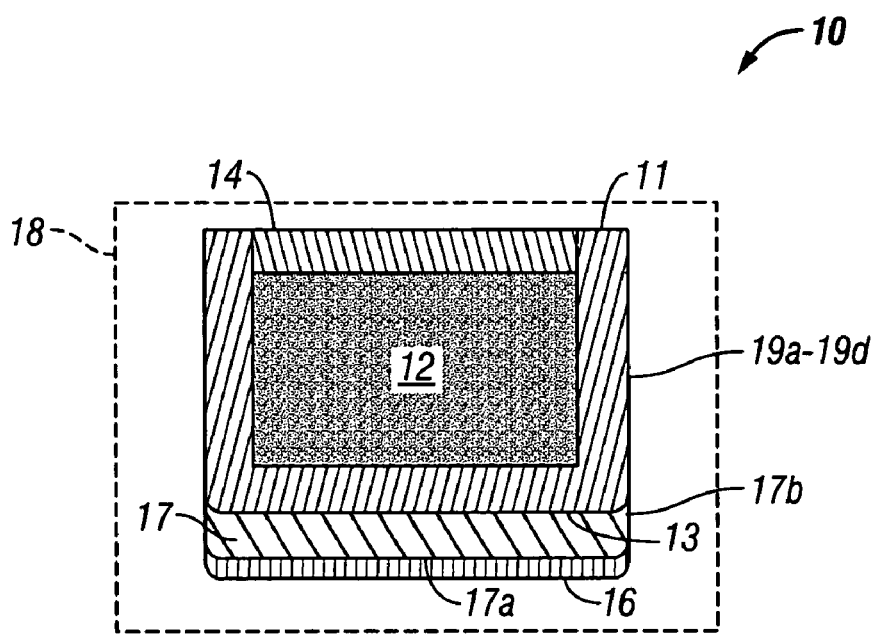
FIG. 1 shows a heat package that includes a heat element or a heat generating material and a container that holds the material to be heated.

FIG. 1 shows a heat package 10 that includes a container 11 that has a bottom 13 and sides 19a-19d. The container 11 is adapted to hold edible items or other materials 12 (medical instruments, heat pads etc.) the user desires. A cover or lid 14 may be used to seal or hold the material 12 in the container 11. The bottom 13 or the entire container 11 is made from a heat conducting material such as aluminum or another alloy. A heat element 17 (also referred to herein as the heat generating material) that will generate heat when exposed to the atmosphere is placed on the bottom 13. A sealing material or seal 16 placed on the bottom surface 17a of the heat element 17 seals the surface 13 and any other exposed surface of the heat element 17, such as sides 17b from the atmosphere. Alternatively or in addition to, the heat package 10 may be placed in a sealed enclosure 18, such as a sealed plastic envelope. The heat package 10 or multiple such packages can then be placed in a container suitable for shipping and storage, such as a heavy paper box or a metal box (not shown). To heat the material 12, the seal 16 and/or enclosure 18 are removed to expose the heat element 17 to the atmosphere, which initializes heat generation. The heat so generated heats the bottom 13 of the container 11, which heat is conducted to the material 12 through the heat conductive bottom 13. The cover 14 aids in trapping the heat in the container 11, which further aids in heating the material 12. After a period of time, which can be from a few to several minutes, the cover 14 can be removed to access the heated material 12 from the container 11. The material 12 as noted above may be an edible material or any other material that is desired to be heated.

Figure 2:
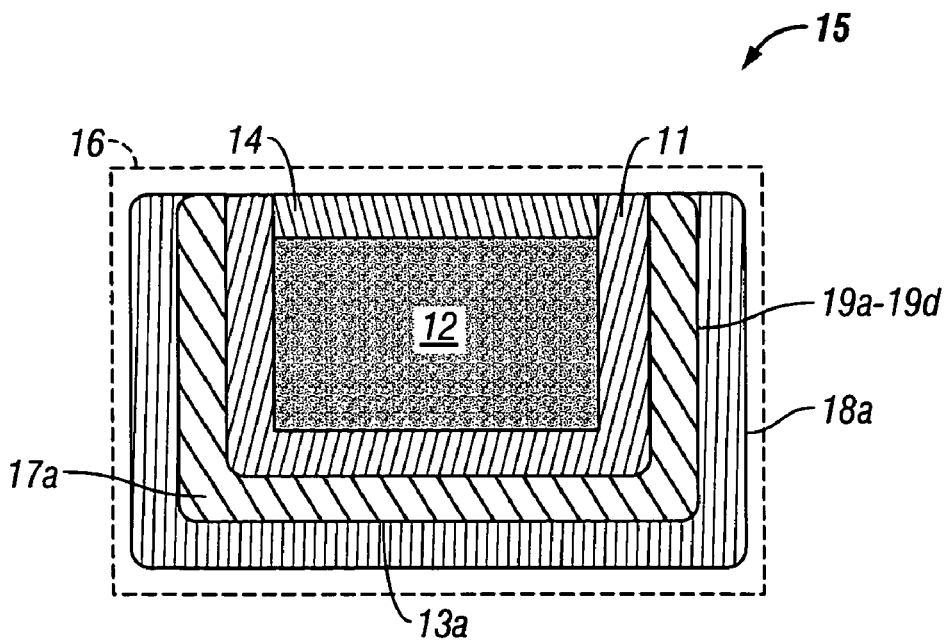
FIG. 2 shows a heat package that includes a heat element wrapped around an outer surface of a container.

FIG. 2 shows a heat package container 15 that includes the heat conducting container 11 having a bottom 13a and sides 19a-19b. A cover 14 encloses the material 12 to be heated in the container 11. In the embodiment of FIG. 2, a heat element 17a is placed substantially around the entire outer surface of the container 11 (bottom 13a and sides 19a-19b) of the container 11. The heat element 17a is sealed or protected from the environment by a seal member 18a. To heat the material 12, the seal member 18a is removed to expose the heat element 17a to the atmosphere, thereby allowing the heat element 17a to generate heat, which conducts through the container 11 to heat the material 12. The heat package 15 may be further enclosed in an outer sealed envelope 16.

Figure 3:
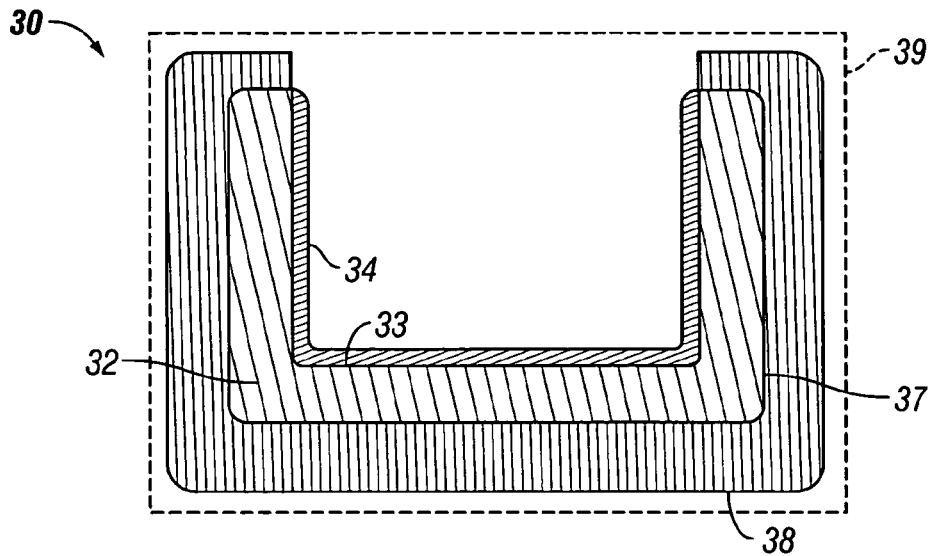
FIG. 3 shows a heat package that includes a heat element enclosed in an insulating material.

FIG. 3 shows a heat package 30 having a heat element 32. The heat element 32 is formed or shaped to hold a container of a desired size. A removable sealing member or element 34, such as a plastic member, seals the inner surface 33 of the heat element 32 from the atmosphere. The outer surface 37 of the heat element 32 is enclosed in an insulating material 38 that seals the outer surface 37 of the heat element 32 from the atmosphere. The insulating material 38 is chosen to partially or fully prevent the heat generated by the heat element 32 from radiating to the atmosphere from the outer surface 37. This arrangement can aid in directing a larger proportion of the generated heat toward the inner surface 33, thereby aiding the heating of the material 12 placed against the inner surface 33, thereby providing a more efficient heat transfer system. The insulating seal 38 may be made from a stiff material that aids in maintaining the shape of the heat element 32 and allows easy handling of the heat package 30 when heat element 32 is generating heat due to exposure to the atmosphere. The insulating material or member 38 may be a molded member. Any suitable material, such as Teflon, or another synthetic material may be used. The member 38 may be fixedly attached to the heat element 32 or may be placed in close contact with the heat element 32. To heat a material (not shown), the inner seal 34 is removed to expose the inner surface 33 of the heat element 32 to the atmosphere. A container, similar to container 11 of FIG. 1 carrying the material to be heated is placed inside the package 30 against the heat element 32. The outer dimensions and configuration of the container carrying the material to be heated are made such that atmospheric air remains in contact with at least a portion of the heat element 32 to ensure continued exposure of the heat element 32 to the atmosphere, which will be needed for the heat element 32 to generate the heat. The heat package 30 may be enclosed in a sealed enclosure 39 instead of or in addition to using the seal 34. The heat package 30 may be further placed in a container or an enclosure (not shown) for shipping purposes.

Figure 4:
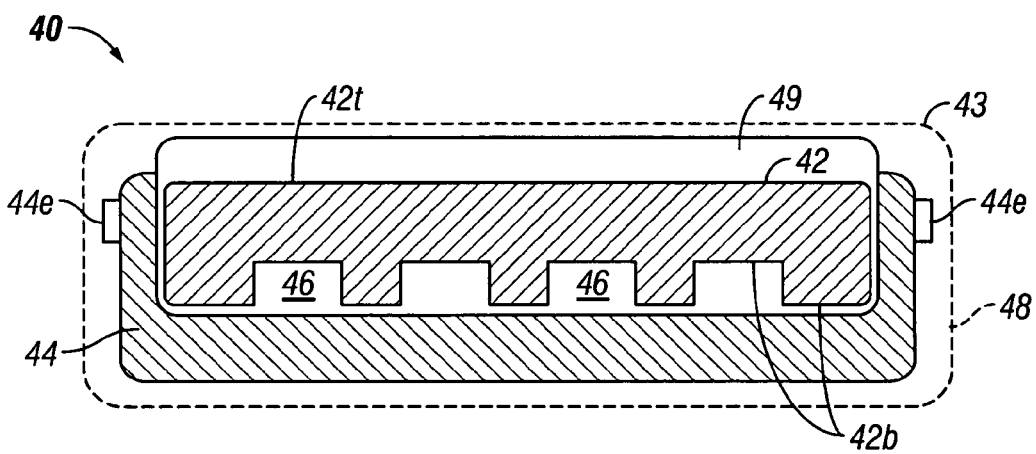
FIG. 4 shows an alternative heat package with the heat element surface enclosed in an insulating material.

FIG. 4 shows another embodiment of a heat package 40 that includes a heat element 42 whose outer surfaces are enclosed by an insulating material 44. In the embodiment shown in FIG. 4, the top surface 42 is not enclosed in an insulating material. Air passages 46 are provided between the heat element bottom surface 42b and the insulating material 44. The heat element 42 along with the insulating material 44 are placed in a sealed enclosure 48, which is removed to expose the heat element 42 to the atmosphere when it is desired to heat a material. A heat-conducting member 49 may be placed on the top surface 42t of the heat element 42 to provide even heat distribution to a material placed thereon.

Still referring to FIG. 4 to activate, the heat element package 40 is removed from the sealed envelope 48, thereby exposing the air passages 46 to the atmosphere, which allows the heat element 42 to react with the air and exothermically generate heat. The insulating member or material 44 prevents at least a portion of the generated heat from radiating to the atmosphere from the bottom 42b of the heat element 42. Such an arrangement aids in directing some amount of the generated heat toward the top surface 42t of the heat element 42. The material or food to be heated, placed in a suitable container, is placed on the top surface 42t of the heat element 42 or on the top of the heat-conducting member 49 when such a member is utilized. The member 49 may be made from any suitable heat conducting metal orallory. The material 49 can aid in rapid and even distribution of heat to an object that is placed in contact therewith. The insulating member 44 may be made from a stiff or a relatively flexible material. The insulating member 44 may be attached to the heat element 42.

The heat element 42 is usually a flexible package. If flexible insulating material 44 is used, it can adapt to any desired contour, such as a human or animal body part and can thus be used more easily and efficiently as a heat pad. A heat pad that has an insulating member 44 can direct a larger portion of the generated heat toward the body than heat pads that allow heat to dissipate to the atmosphere from surfaces that are not in contact with the body. The heat package 40 can be pre-molded into any desired configuration, such as a configuration to fit or wrap around a body part, such as a knee, shoulder, calf, elbow, neck etc. A strap or any suitable fastener may be attached to the insulating member ends 44e to wrap the heat element 42 around the desired object. The outer and inner contours of the heat package 40 can be designed or chosen for any particular intended use. The contours may have any shape and dimensions. For heat pad type applications the member 49 may be a fabric or any other material that is suitable for contact with the human body or the object intended to be heated. Alternatively, the entire package heat package 40 may be enclosed in a material suitable for heat pad. The heat package 40 is enclosed in a sealed package 43 for storage.

Figure 4A:
FIG. 4A shows the heat package of FIG. 4 with a strap.

FIG. 4a shows the insulating member 44 of the heat package of FIG. 4 with straps 49a and 49b for attaching the heat package 40 to a body part or another object. The strap 49a has a Velcro-type material 41a or any other type of locking arrangement, such as a buckle arrangement, or any other suitable arrangement, at its far end 43a. The strap 49b has a locking arrangement 41b at its far end 43b that is compatible with the locking arrangement 41a. The locking arrangement 43a and 43b when placed together lock with each other.

Figure 5:
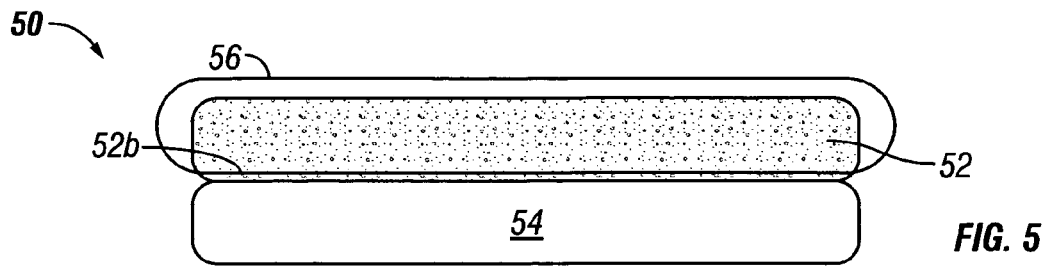
FIG. 5 shows a heat package that includes an insulating member attached to a bottom surface of a heat element.

FIG. 5 shows a heat package 50 that includes an insulating member 54 attached to a bottom side 52b of a heat element 52. The exposed surfaces of the heat element 52 are sealed from the atmosphere with a suitable material 56. The sealing material 56 may enclose the heat package including the insulating member 54.

Figure 6:
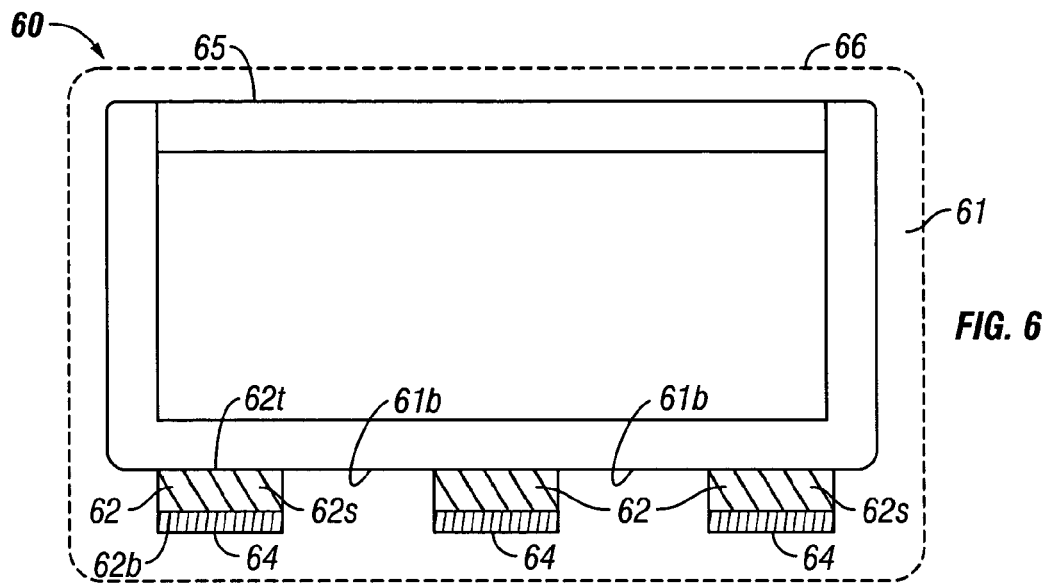
FIG. 6 shows a heat package wherein heat element strips are placed against a bottom side of a conductive container.

FIG. 6 shows a heat package 60 that includes a container 61 with a number of heat generating element strips or members 62 in contact with its bottom sides 61b. An insulating material 64 may be placed on the bottom 62b of each heat-generating element 62. The elements 62 may be straight heat strips or of any other desired configuration. The package thus described is placed in a sealed enclosure 66. To use the package 60, the envelope or sealed enclosure 66 is removed to expose the sides 62s of the heat elements 62 to the atmosphere, which causes them to generate heat due to exothermic reaction. The heat so generated heats the container 61 which is made from heat conducting material, such as aluminum or another suitable material. The food or any other material placed in the container 61 can be accessed by removing the cover 65. The insulating material 64 on the bottom sides of the strips 62 aids in directing the heat toward the container 61. The sides 62s of the strips are at least partially exposed to the atmosphere while their top surface 62t remains in contact with the container 61.

Figure 6A:
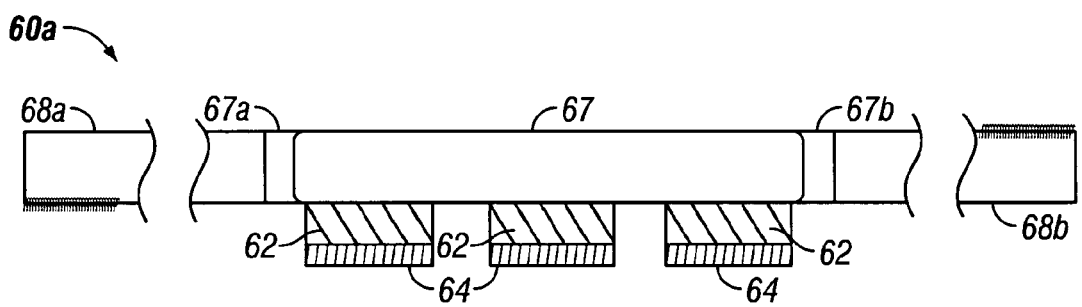
FIG. 6A shows heat package with straps attached to a relatively flat heat conductive material.
Figure 6B:
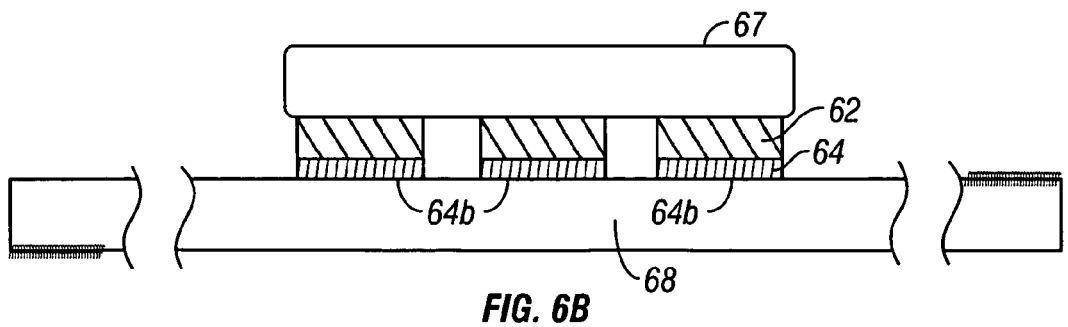
FIG. 6B shows a heat package with a strap attached to insulating member protecting heat elements.

Instead of using a container 61, a relatively flat member 67 of any shape and size may be used, as shown in the heat package 60a of FIG. 6A. Such a package can be wrapped around an object, such as a body part. Straps 68a and 68b may be attached respectively to opposite ends 67a and 67b of the member 67 or in the alternative as shown in FIG. 6B, a strap 68 may be attached to the bottom sides 64b of the insulating materials 64.

Figure 7:
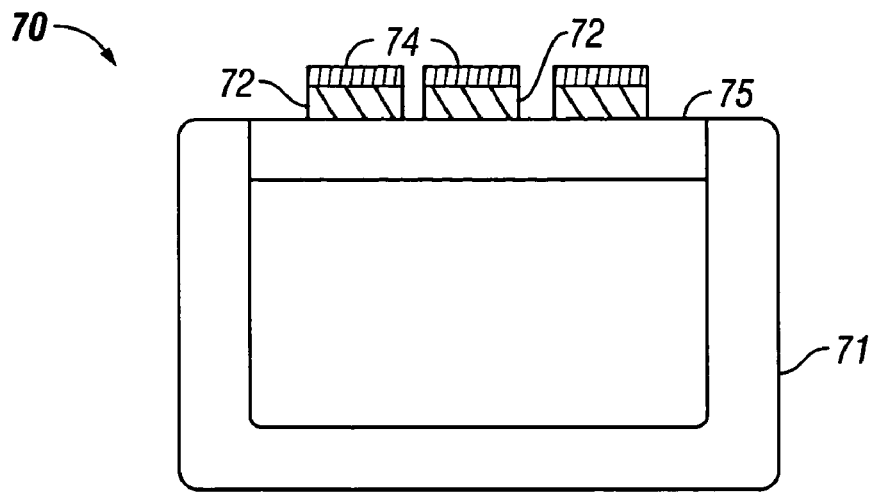
FIG. 7 shows a heat package that includes heat element strips attached to a cover of a heat-conducted container.

The embodiment 70 shown in FIG. 7 conceptually is similar to that of FIG. 6. The heat strips 72 lined on one or more sides with an insulating material 74 are attached to the container cover 75. Once the material in the container 71 is heated, the cover 75 is removed to expose the material in the container 71. It should be noted that the heat strips 64 may be selectively attached in any configuration to any member that is desired to be heated. The size and shape of the strips is chosen depending upon the object to be heated. Such an arrangement provides great flexibility and uses optimal amount of materials.

Figure 8:
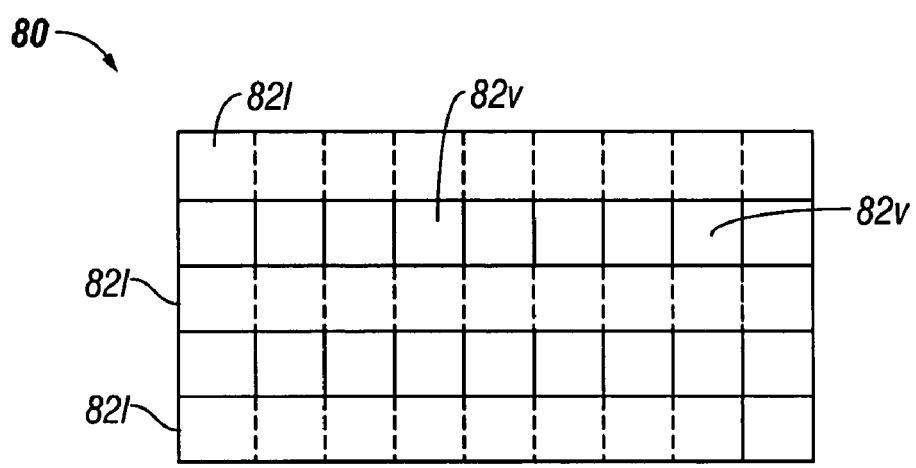
FIG. 8 shows a pattern of heat strips.

In the embodiments of FIGS. 6, 6A and 7, the heat elements may be arranged in any suitable pattern. FIG. 8 shows a rectangular matrix pattern wherein heat elements 82v are placed in a first direction while heat elements 82v are placed in a second cross direction. The elements 82v and 82v may be interwoven or placed one on top of the other as shown in FIG. 8 or may have no overlap.

Figure 9:
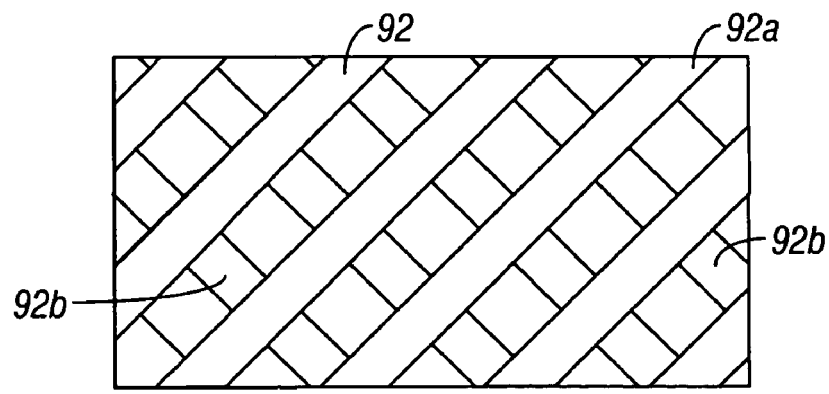
FIG. 9 shows an alternate pattern of heat strips.

FIG. 9 shows an angular pattern of heat elements wherein heat elements 92a are placed on top of elements 92b. Alternatively, the heat elements 92a and 92b may be interwoven at an angle. The heat elements may also be placed in a non-overlapping manner.

Figure 10:
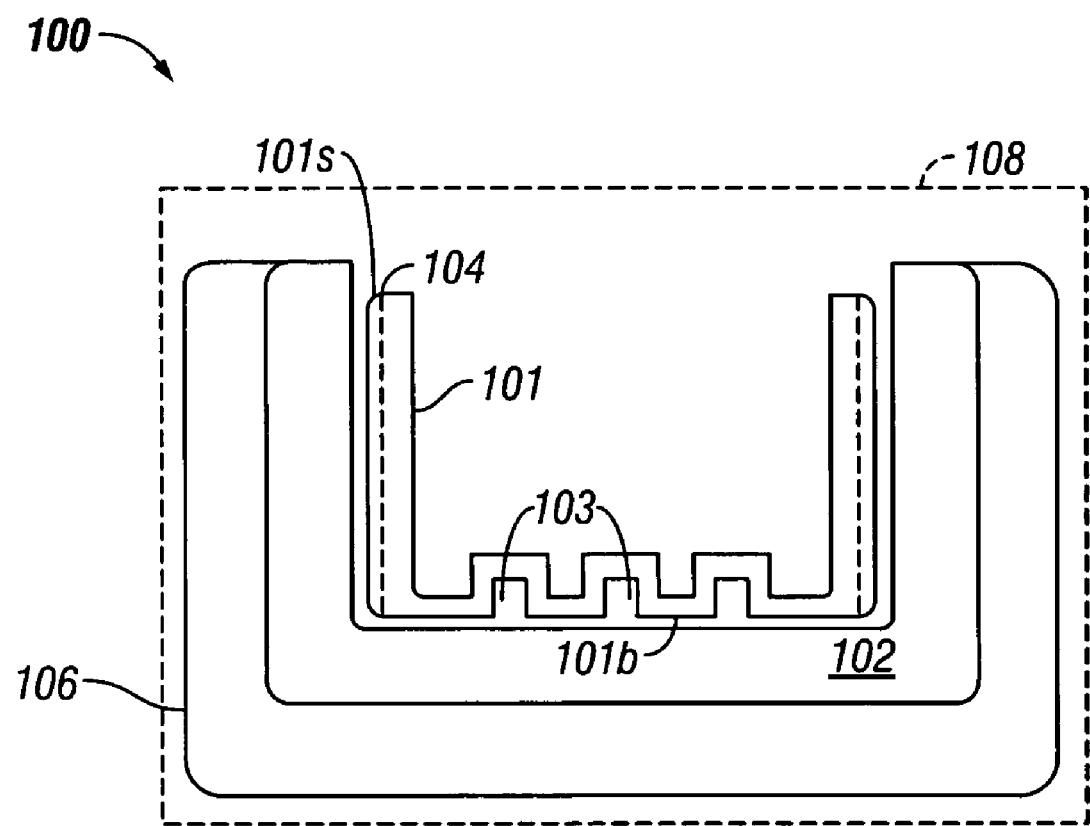
FIG. 10 shows a heat package in which air gaps are provided between a heat conducting member and a heat-generating member.

FIG. 10 shows a heat package 100 that includes a heat-generating element 102 placed or lined inside an insulating liner 106. A container 101 is placed in the heat element enclosure 102. The outside of the container 101 is designed to provide one or more air passages or spaces between the container 101 and the heat element 102. The air passages may be in the form of air channels 104 that run along the sides 101s of the container 101 and/or air passages or spaces 103 along the bottom 101b of the container 101. The container 101 is made from a heat conducting material, such as aluminum, copper or another suitable alloy. The container 101 placed in the heat-generating element 102 is enclosed in a sealed outer enclosure 108, such as made from a plastic or a polyurethane material. Any suitable material can be used for the outer enclosure 108. When the outer enclosure 108 is removed, air flows along the air passages 103 and or 104 that allow the heat element to generate heat. The insulating material 106, if used, aids in directing heat toward the container 101.

It should be understood that embodiments of the present invention can include heat elements formulated or configured to produce selected amounts of thermal energy. For instance, the heat element can be configured to heat a material to no greater than a maximum temperature. This may be advantageous, for instance, to prevent a food, such as infant formula, from injuring a child when ingested. Also, the heat element can be configured to heat a material at least a minimum temperature, such a temperature at which the material is predicted to have a specified degree of sterilization. Other embodiments can include a selected temperature range. In still other embodiments, the heat produced by the heat element can be user selectable. For example, a selective removal of the insulating material and thus the selective exposure of the heat element to the atmosphere can produce a corresponding controllable heat generation by the heat element. Furthermore, in certain embodiments, the seal or other material or member covering the heat element can be re-usable, e.g., re-attached to the heat element. This may be advantageous to temporarily or permanently halt the heating process.

The foregoing description is directed to particular embodiments of the present invention for the purpose of illustration and explanation. It will be apparent, however, to one skilled in the art that many modifications and changes to the embodiment set for the above are possible without departing from the scope and the spirit of the invention. It is intended that the following claims be interpreted to embrace all such modifications and changes.

What is claimed is:

1. A disposable heat package, comprising:
   a container formed using an insulating member;
   a heat-generating element in the container, wherein the heat-generating element generates heat when it comes in contact with the outside air;
   a heat-conductive container configured to contain a material to be heated, placed on the heat-generating element for transferring heat from the heat-generating element to the material inside the heat-conductive container, wherein the heat-generating element is placed only on one of a side and bottom surface of the heat-conductive container; and
   a disposable seal for protecting the heat-generating element from the outside air, and wherein the heat-generating element is exposed to the outside air only when the disposable insulating member is removed from the container formed of the insulating member.

2. The heat package of claim 1 further comprising at least one air space between the heat-generating element and the container formed using the insulating member.

3. The heat package of claim 2 wherein the at least one air space includes at least one air channel between the heat-generating element and the container formed using the insulating member.

4. The heat package of claim 3, wherein the heat-conductive container is a metallic member.

5. The heat package of claim 1, wherein the disposable seal surrounds the container and prevents exposure of the heat generating element to the outside air atmosphere.

6. The heat package of claim 5, wherein the heat-generating element generates heat when the seal is removed from the heat package.

7. The heat package of claim 1, wherein the heat-generating element lines an inside surface of the container.

8. The heat package of claim 1, wherein at least a surface of the heat-generating element is sealed from the atmosphere with the disposable seal.

9. The heat package of claim 8, wherein the disposable seal is made from one of (i) a plastic material; (ii) a polyurethane material; (iii) a metal; and (iv) an alloy.

10. The heat package of claim 1, wherein the heat-generating element comprises a plurality of spaced apart strips, each strip generating heat when exposed to the outside air atmosphere.

11. The heat package of claim 10, wherein the plurality of heat-generating strips are arranged in a pre-determined pattern.

12. A heat package, comprising:
    a heat-conductive container configured to hold therein a material to be heated;
    a heat-generating element attached to an outside surface of the heat-conductive container, the heat-generating element configured to generate heat when exposed to an outside air; and
    a removable seal configured to seal an outside surface of the heat-generating element, wherein the heat-generating element is exposed to the outside air to generate heat only when the seal is removed from the heat-generating element.

13. The heat package of claim 12 further comprising an insulating material attached to a surface of the heat-generating element that is not in contact with the heat-conductive container to aid in conducting heat generated by the heat-generating element toward the heat-conductive container.

14. The heat package of claim 12, wherein the heat-conductive container contains the material therein and a lid that seals the material in the container.

15. The heat package of claim 12, wherein the heat-generating element includes a plurality of heat members attached to a surface of the heat-conductive container with an air space between the heat members.

16. The heat package of claim 12, wherein the heat-generating element wraps around the heat-conductive member.

17. The heat package of claim 16 further comprising an insulating member that wraps around the heat-generating element.

* * * * *